United States Patent
Touzelbaev

(10) Patent No.: US 9,263,944 B2
(45) Date of Patent: Feb. 16, 2016

(54) VALLEY-FILL POWER FACTOR CORRECTION CIRCUIT WITH ACTIVE CONDUCTION ANGLE CONTROL

(71) Applicant: Maxat Touzelbaev, San Jose, CA (US)

(72) Inventor: Maxat Touzelbaev, San Jose, CA (US)

( * ) Notice: Subject to any disclaimer, the term of this patent is extended or adjusted under 35 U.S.C. 154(b) by 0 days.

(21) Appl. No.: 14/590,944

(22) Filed: Jan. 6, 2015

(65) Prior Publication Data

US 2015/0194883 A1 Jul. 9, 2015

Related U.S. Application Data

(60) Provisional application No. 61/924,180, filed on Jan. 6, 2014.

(51) Int. Cl.
*H05B 41/16* (2006.01)
*H02M 3/156* (2006.01)
*H05B 33/08* (2006.01)

(52) U.S. Cl.
CPC ........... *H02M 3/156* (2013.01); *H05B 33/0815* (2013.01)

(58) Field of Classification Search
CPC ............. H05B 33/0815; H05B 41/232; H05B 33/0809; H05B 33/0824; H02M 3/156; Y02B 70/126
USPC ................ 315/247, 291, 307, 274, 186–188, 315/200 R, 193
See application file for complete search history.

(56) References Cited

U.S. PATENT DOCUMENTS

| | | | |
|---|---|---|---|
| 5,396,153 A | 3/1995 | Shackle | |
| 7,541,746 B2 * | 6/2009 | Pruett | H05B 41/28 315/224 |
| 8,698,406 B2 * | 4/2014 | Radermacher | H02M 1/08 315/185 R |
| 8,791,641 B2 * | 7/2014 | van de Ven | H05B 33/0809 315/188 |
| 2004/0085788 A1 | 5/2004 | Weng | |
| 2013/0207567 A1 | 8/2013 | Mednik | |
| 2014/0340943 A1 | 11/2014 | Kotowski | |
| 2015/0181659 A1 * | 6/2015 | Kang | H05B 33/0809 315/186 |

FOREIGN PATENT DOCUMENTS

| | | |
|---|---|---|
| CN | 103312144 | 9/2013 |
| CN | 103762868 | 4/2014 |

\* cited by examiner

*Primary Examiner* — Haissa Philogene
(74) *Attorney, Agent, or Firm* — Aka Chan LLP

(57) ABSTRACT

A valley-fill circuit with active conduction angle control allows use of a single storage capacitor instead of two. The capacitor is charged to the maximum voltage of the AC cycle, which makes possible use of low-capacitance high-voltage low ESR capacitors, increases energy storage density and decreases circuit footprint. This makes it feasible to use ceramic capacitors, such as a multilayer ceramic (MLCC), polyethylene, polypropylene, or any suitable capacitor type in addition to electrolytic capacitors. This improves the operational longevity and reduces the footprint of the circuitry.

3 Claims, 12 Drawing Sheets

VALLEY-FILL POWER FACTOR CORRECTION CIRCUIT WITH ACTIVE CONDUCTION ANGLE CONTROL

CROSS-REFERENCE TO RELATED APPLICATIONS

This patent application claims priority to U.S. patent application 61/924,180, filed Jan. 6, 2014, which is incorporated by reference along with all other references cited in this application.

BACKGROUND OF THE INVENTION

This invention relates to electrical circuits and more specifically to a power supply designed for the use with durable, long lifespan components while having acceptable power factor.

For alternating current (AC) distribution of electrical power, power factor is the ratio of the real power flowing to a load, to the apparent power in the circuit, and is a dimensionless number between −1 and 1. Real power is the capacity of the circuit for performing work in a particular time. Apparent power is the product of the current and voltage of the circuit.

Due to energy stored in the load and returned to the source, or due to a nonlinear load that distorts the wave shape of the current drawn from the source, the apparent power will be greater than the real power. A negative power factor occurs when the device which is normally the load generates power which then flows back towards the device which is normally considered the generator.

A high power factor is generally desirable in a transmission system to reduce transmission losses and improve voltage regulation at the load. It is often desirable to adjust the power factor of a system to near 1.0. When reactive elements supply or absorb reactive power near the load, the apparent power is reduced. Power factor correction may be applied by an electric power transmission utility to improve the stability and efficiency of the transmission network. Individual electrical customers who are charged by their utility for low power factor may install correction equipment to reduce those costs.

Therefore, there is a need for improved power factor correction circuitry that brings the power factor of an AC power circuit closer to 1 by supplying reactive power of opposite sign.

BRIEF SUMMARY OF THE INVENTION

A valley-fill circuit has power factor correction circuit with active conduction angle control. The valley-fill circuit uses a single storage capacitor instead of two. The capacitor is charged to the maximum voltage of the AC cycle, which increases energy storage density so that it is possible to use of low-capacitance high-voltage capacitors. This makes it feasible to use multilayer ceramic capacitors (MLCC), polyethylene, polypropylene, or other capacitors with similar low-capacitance high-voltage, low equivalent series resistance (ESR), or combinations of these, instead of electrolytic capacitors. This improves the operational longevity and durability of the circuitry and reduces its footprint. In many applications, electrolytic capacitors are chosen with higher than needed capacitance, in order to meet the requirements on the acceptable ESR, thus additionally increasing the circuit footprint.

In a specific implementation, a circuit includes: (1) a storage capacitor, implemented using a ceramic, polyethylene, polypropylene, electrolytic, or any other suitable type of capacitor, with one of terminals (negative if capacitor is polarized) connected to ground and another terminal connected to; (2) a parallel pair comprised of a first diode and a charge-current limiting resistor, connected in parallel to each other and in series to the storage capacitor, with diode, connected to conduct with capacitor discharge, to reduce resistive losses in charge limiting resistor, (3) a high-side switch implemented as a PMOS transistor, having an internal body diode and gate, drain, source electrodes, whose source is connected to current-limiting diode-resistor pair and whose drain is connected to an input to converter circuit; (4) a second diode, with cathode connected to an input to a converter circuit and an anode connected to an output from bridge rectifier, which is reverse-biased while storage capacitor discharges.

In general, a storage capacitor, charge-current limiting diode-resistor parallel pair, and a switch are connected in series in an arbitrary manner, provided that a switch element is effectively controlled during charge-discharge cycles. In this implementation, connection of source and drain electrodes of a typical PMOS transistor, implemented as high-side switch, reduces component count by making use of the built-in transistor body diode, whose anode is connected to a drain terminal of the transistor, which conducts with storage capacitor charging.

In a specific implementation, a frequency-monitoring circuit is used to initiate storage capacitor discharge once frequency of a converter circuit reaches a minimum acceptable value. The circuit includes a retriggerable multivibrator to sense crossing of switching frequency below the threshold value and a one-shot multivibrator to provide the discharge duration time within the designed timing envelope.

In a specific implementation, a light emitting diode lamp includes a valley-fill power factor correction circuit with active conduction angle control.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
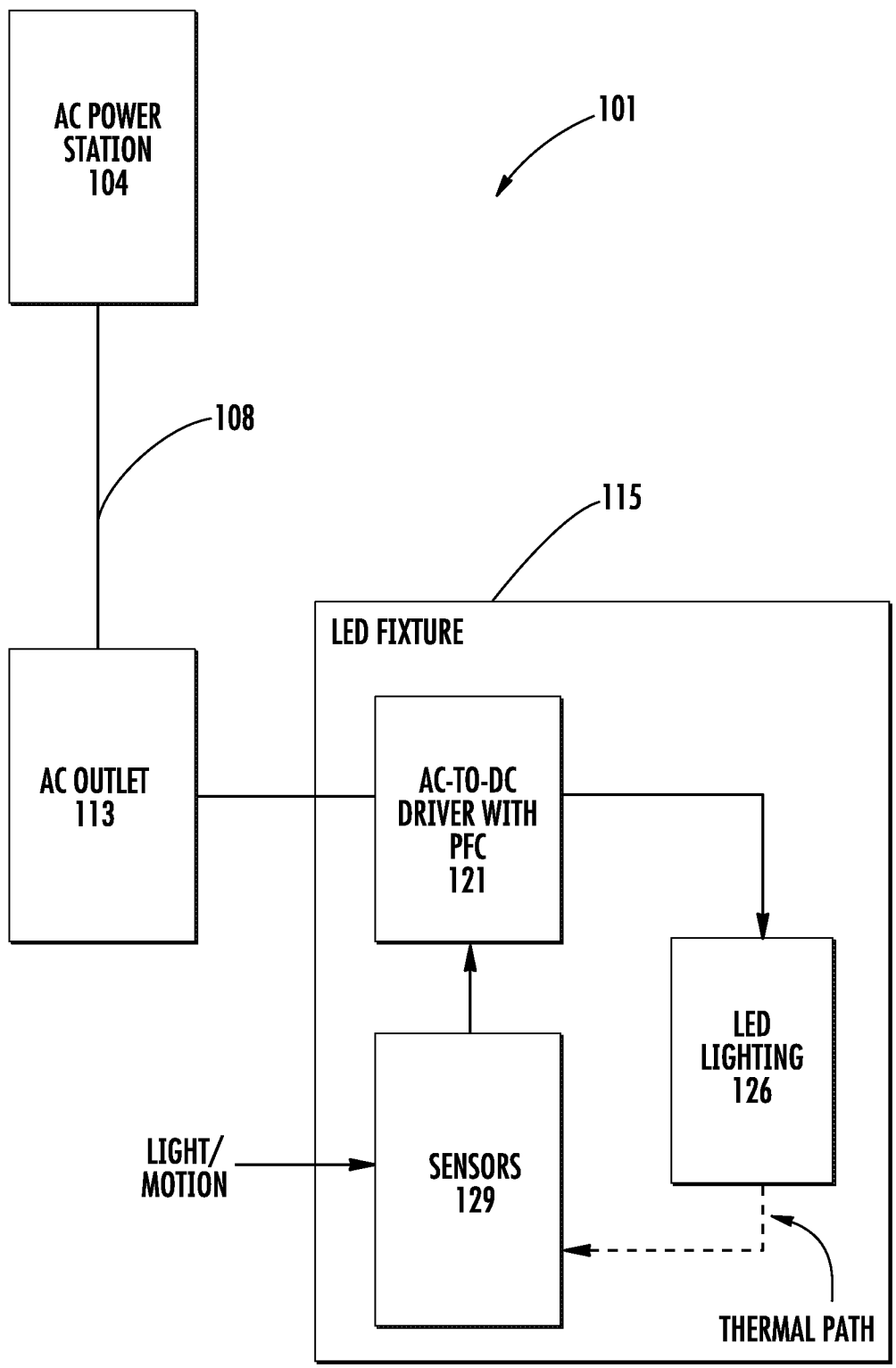
FIG. 1 shows an AC power distribution system and a load connected to the system.

FIG. 1 shows an AC power distribution system 101 and a load connected to the system. Power is generated by an AC power station 104 and is distributed by transmission lines 108 to an outlet 113 (or other connection point) where an electrical load 115 is connected.

As an example, the load can be a light emitting diode (LED) lighting, such as used for street lighting or lighting inside a home. LED lighting uses direct current (DC) rather than alternating current (AC) power, which is provided by the AC power distribution system. So, the AC power is converted into DC power user an AC-to-DC converter 121. Since LED lighting is a current device, its driver should have provisions for current control.

FIG. 1 shows a single load as an example. In a typical system, there are numerous loads (e.g., 2, 3, 4, 8, 100s, 1000s, 10,000, or more). Some examples of loads of a system include street lighting, signal lights, computers, televisions, and many others.

DC current is supplied to LED lighting circuitry 126, which can include metal core printed circuit board (MCPCB), heat sink, integrated circuits, or other components on the printed circuit board (PCB), or any combination of these.

The LED circuitry contains one or more light emitting diode (LEDs), which can be connected in series or parallel, and may have additional components such as resistors and zener diodes. The number of LEDs used in a lighting fixture will depend on the brightness or output lumens for an individual LED, and the total desired output lumens for that fixture.

The LED lights can be connected to sensors 129 that connect to the AC-to-DC converter 121. The sensors can be, for example, temperature sensors that provide feedback to the AC-to-DC converter circuitry to alter its operation, or light and motion sensors to additionally control LED circuitry.

For example, if the temperature of the LED lighting rises above a threshold, the circuitry can reduce power so that the temperature decreases. Similarly, if the temperature of the LED lighting decreases below a threshold, the circuitry can increase power so that the temperature increases to be closer to the threshold. Using such a feedback technique, the longevity of the LED lighting can be increased.

Figure 2:
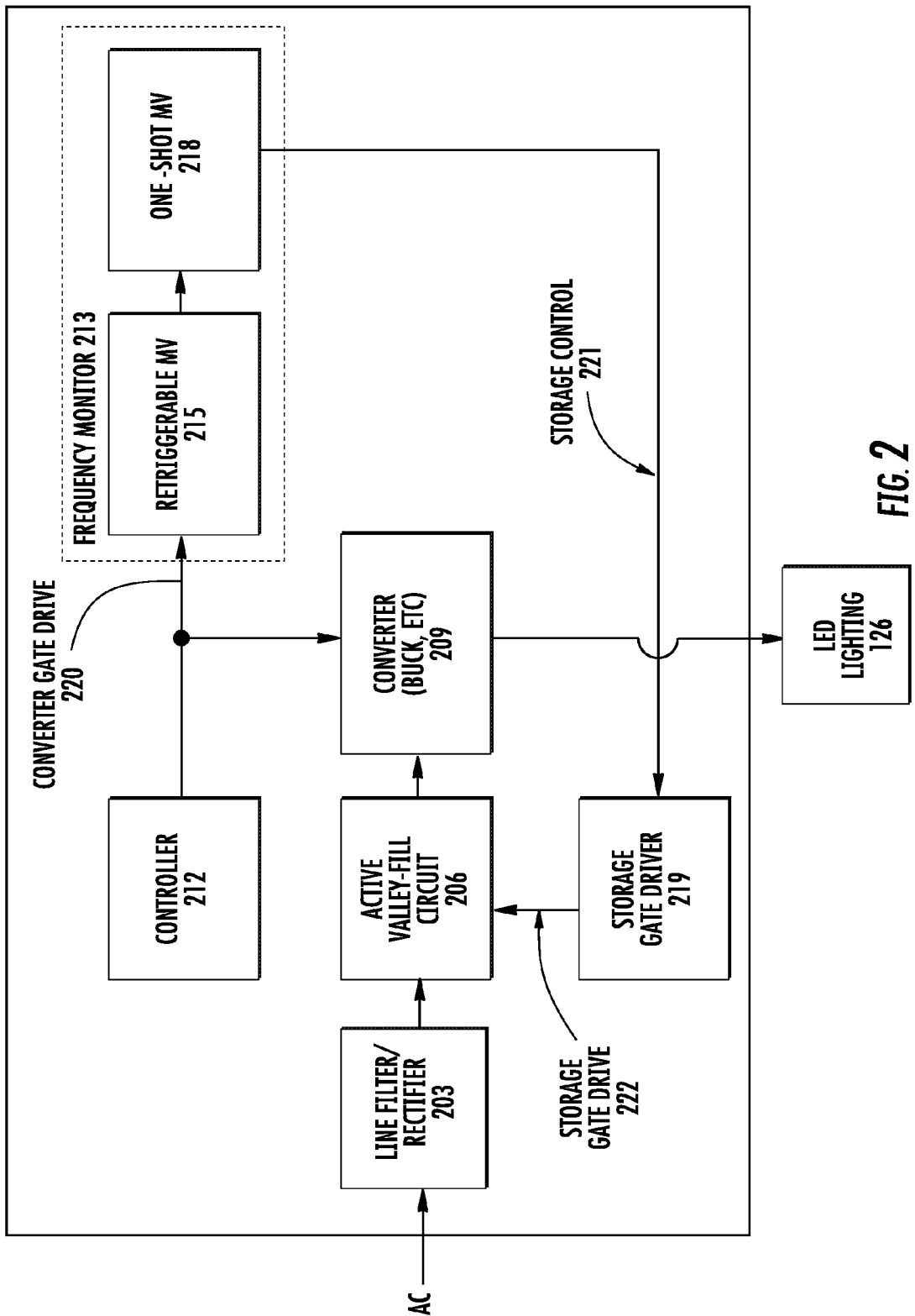
FIG. 2 shows a block diagram an AC-to-DC converter circuit with power factor correction.

FIG. 2 shows a block diagram an AC-to-DC converter circuit with power factor correction (PFC). The circuit includes a line filter and rectifier circuit 203 that is connected to AC power. Some examples of rectifier circuits include half-wave and full-wave rectifiers. The output of the line filter and rectifier circuit is a rectified signal.

The output of line filter and rectifier circuit is connected to an active valley-fill circuit 206. An output of the active valley-fill circuit is connected to a buck (or any other suitable topology) converter 209. The converter is also connected to a LED controller's circuit 212 gate drive terminal. The LED controller can be a high voltage pulse-width modulation (PWM) peak-current mode LED driver-controller, such as an AL9910 integrated circuit from Diodes Incorporated. Data sheets, white papers, on-line information, and other documents for the AL9910 integrated circuit are incorporated by reference along with all other references cited in this application.

The LED controller's gate drive terminal is additionally connected to a frequency monitoring circuit 213. In this particular implementation, it is realized using a combination of a retriggerable multivibrator and one-shot multivibrator. The retriggerable circuit can be a realized using a half of a dual precision monostable multivibrator, such as a CD4538 integrated circuit made by manufacturers including Fairchild Semiconductor, Texas Instruments, Futurelec, and others. Data sheets, white papers, on-line information, and other documents for the CD4538 integrated circuit are incorporated by reference along with all other references cited in this application.

An output of the retriggerable circuit is connected to a one-shot circuit 218, which can be made using the remaining half of the CD4538. The output 221 of one-shot circuit is connected to a storage gate driver circuit 219, which is connected to active valley-fill circuit 206.

Figure 3:
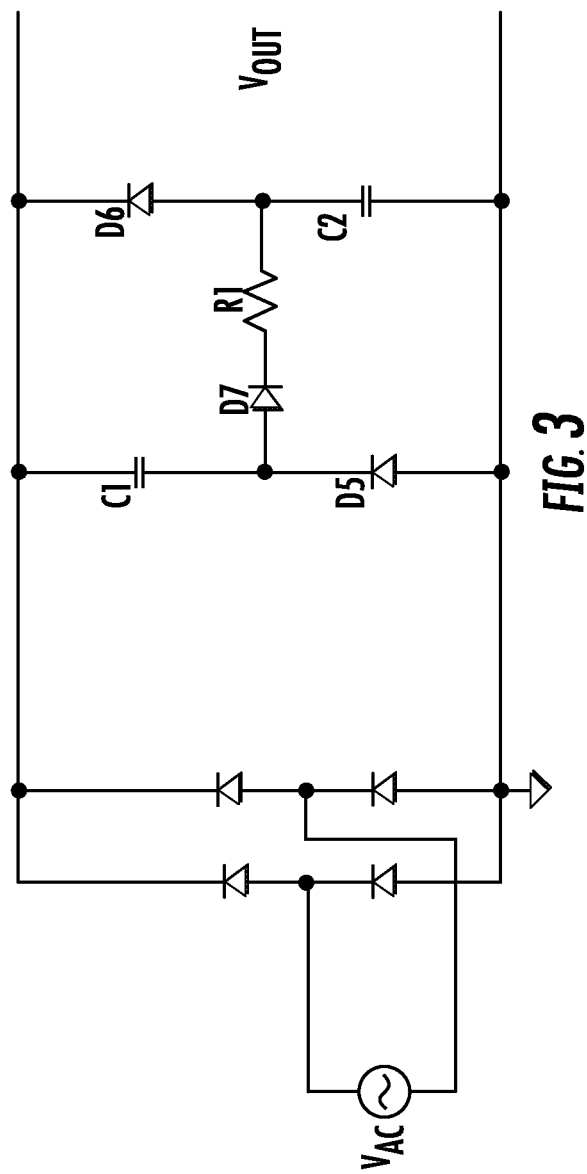
FIG. 3 shows a passive valley-fill circuit.

FIG. 3 shows a passive valley-fill circuit (VFC). Passive valley-fill circuits significantly improve power factor of switching power supplies compared to typical circuits, which use bulk capacitors, by improving conduction angle and thus drawing power from the AC line through a significant portion of an AC cycle.

A passive valley-fill circuit has fixed transition voltage, at around half of maximum voltage, when switching to storage capacitors, which limits the conduction angle and therefore the circuit power factor. Also, passive valley-fill circuit uses at least two capacitors, charged to half-max value, which decreases energy storage density and increases bulk component count and therefore circuit footprint.

For this valley-fill circuit, there are two capacitors C1 and C2. A stored energy per capacitor is $(C*(Vmax/2)^2)/2 = (C*(Vmax^2))/8$. In this application, the caret symbol (^) is used to signify exponentiation. As an example, for $b^\wedge n$, b is the base number and n is the exponent or power. A charge current flows across capacitor C1, through diode D3, charge-current limiting resistor R1, and across capacitor C2. A discharge current flows from ground through diode D1 and across capacitor C1, and also from ground across capacitor C2 and though diode D2.

The passive valley-fill circuit uses two capacitors and three current steering diodes to provide the needed commutation between the AC power line and the storage elements to feed the core power supply circuitry. At least two capacitors needed, and the conduction angle is limited.

Figure 4:
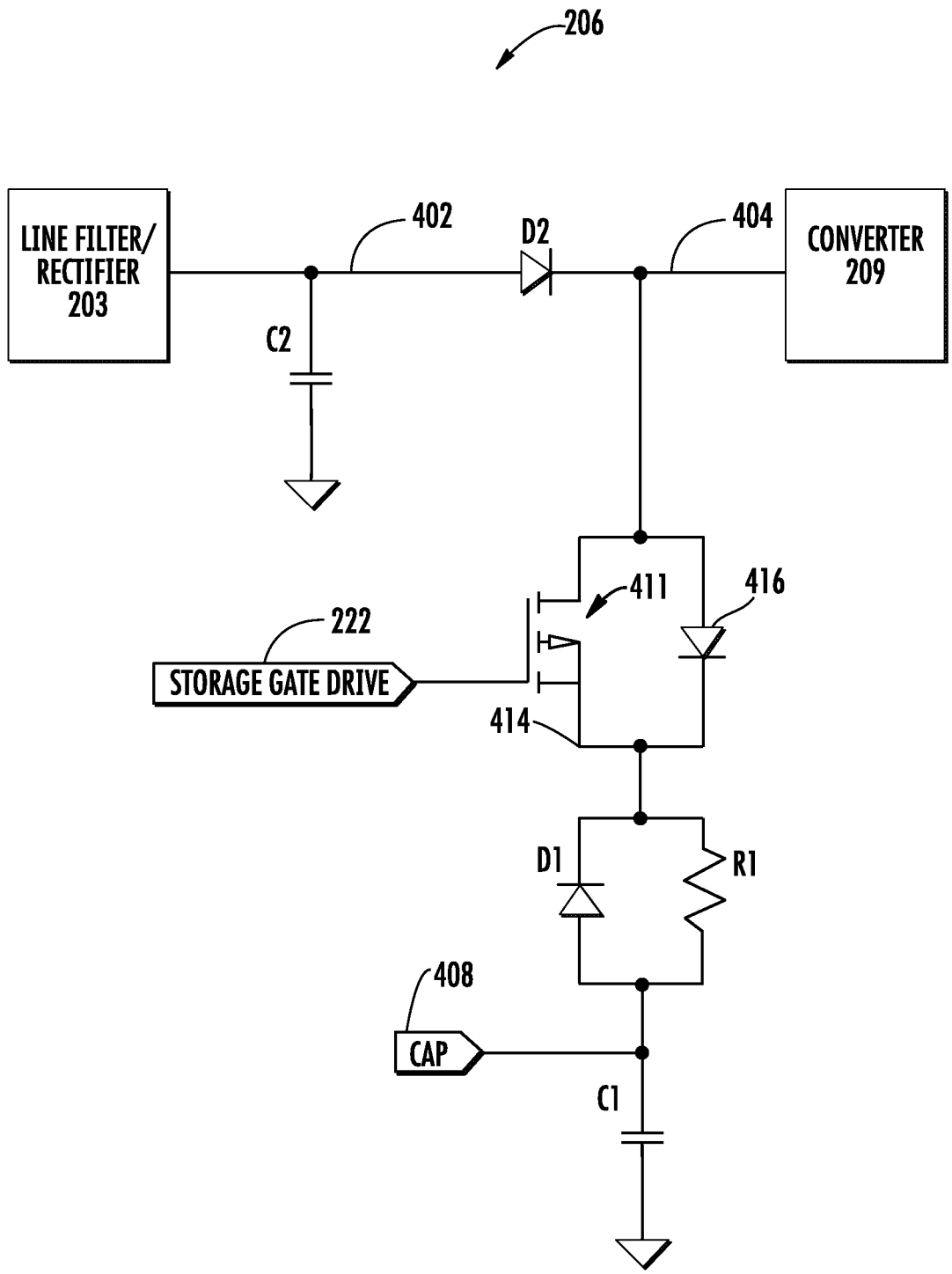
FIG. 4 shows an active valley-fill circuit with active conduction angle control.

FIG. 4 shows an active valley-fill circuit with active conduction angle control. Compared to a passive valley-fill circuit, an active valley-fill circuit with active conduction angle control has the following advantages:

(1) Depending on minimum required voltage, conduction angle can be improved compared to that of passive valley-fill circuit.

(2) Minimum number of storage capacitors is just one, compared to minimum of two for passive valley-fill circuit.

(3) The capacitor is charged to the maximum voltage of the AC cycle, close to root-mean-square (RMS) voltage times the square root of 2. This increases energy storage density by at least four-fold (or more, depending on minimum required voltage) per used capacitor, when compared to valley-fill circuit, provided the right capacitor voltage rating. It also makes possible efficient use of low-capacitance high-voltage capacitors, such as ceramic, polyethylene, polypropylene, and other capacitors, in addition to electrolytic, and combinations of these.

The equivalent series resistance (ESR) of a ceramic, polyethylene, or polypropylene capacitor is generally lower than an electrolytic, especially of the same size. To obtain a lower equivalent series resistance in an electrolytic capacitor, a larger capacitance may be used than is needed for the circuit to operate. If the equivalent series resistance is too high, electrolytic capacitor may be damaged.

(4) The feature (3) results in significant savings and footprint reduction.

(5) This makes economically feasible possible use of capacitors other than typically used electrolytic capacitors, such as MLCC ceramic capacitors or polyethylene capacitors.

(6) Since electrolytic capacitors are typically the least reliable circuit component, this invention can result in a much improved overall product reliability.

In FIG. 4, a storage capacitor C1 is connected between a node 408 (Cap) and ground. In a specific implementation, this capacitor can be in the order of several microfarad. A node 402 is connected to the rectified filtered line voltage. A node 404 is connected to a buck (or any other topology) converter (see FIG. 5). Between nodes 402 and 404 is a diode switch D2. This switch isolates a converter from input during the storage capacitor discharge, to prevent electrical interactions with input stage filters and rectifiers.

Between nodes 404 and 414 is a transistor 411. In a specific implementation, the transistor is a PMOS transistor. One having ordinary skill in the art recognizes this PMOS transistor can be replaced can be replaced with another transistor or active device such as a NMOS transistor, FET, JFET, bipolar junction transistor, and others. Although only a single transistor is depicted, the transistor may be implemented using a number of transistors connected in parallel.

In a specific implementation, a high-side switch configuration is chosen for managing charge-discharge cycles of a storage capacitor. Just as in classic valley-fill circuit, a diode 416 is used to provide charge current thru a current-limiting resistor R1. Once the peak voltage of the AC cycle is passed, this diode 416 is reverse-biased, preventing storage capacitor discharge. A transistor switch 411 can then be engaged to supply the converter circuit from the storage capacitor once the AC-cycle approaches zero-crossing. In this specific implementation, a PMOS transistor, connected between nodes 404 and 414 is used for this switching. Specifically, connection of a drain terminal of a typical PMOS transistor to node 404 and connection of source terminal to node 414, makes use of a body diode of a typical PMOS transistor for the functionality of the above-discussed diode 416, thru which capacitor charges. This feature allows further reduction of the component count.

A diode D1 is connected between nodes 414 and 408. An above-mentioned charge-current limiting resistor or resistance R1 is connected between nodes 414 and 408.

In operation, the active valley-fill circuit cycles through (1) charge/conduction, (2) conduction, and (3) discharge phases or modes.

1. Charge/Conduction Phase. During the charge/conduction phase, both D2 and diode 416 are forward biased. Body diode 416 bypasses control switch if it is not on.

Capacitor charges to a maximum voltage $V_{max}=V_{rms}*sqrt(2)$. Only one cap is needed.

Stored energy is $(C*V_{max}^2)/2$, four-fold the value per cap than in classic valley fill circuit, which charges caps to half the max voltage.

This mode completes when line voltage passes maximum.

2. Conduction Phase. Once line voltage passes Vmax and no PMOS drive is applied (i.e., gate is at V(Cap)), the body diode reverse biases and capacitor locks out.

The conduction to load only, which ends when output voltage reaches acceptable minimum. The duty cycle at buck converter approaches 1.

The conduction phase can extend to line voltages below half of the maximum, which is the case for a classic valley-fill circuit.

This improves conduction angle to below that of a classic valley circuit and further reduces the needed capacitance of C1 proportionally to reduction of discharge time.

3. Discharge Phase. When Vcap is at Vmax and storage switch turns on, D2 gets reverse biased, and capacitor supplies the output current.

During discharge phase, line voltage crosses zero. The discharge phase ends when the line voltage returns to above V(Cap). Then the cycle starts again.

C1 should be selected so V(Cap) does not drop below some minimum voltage. An example is an LED string of forward voltages.

To select R1 and D1, R1 is used to limit the inrush charge current and prevent oscillations that otherwise would occur in LC contour formed by line filter inductance L and storage capacitance C=C1. With the use of R1, an RLC contour instead forms, which can be tuned to provide best damping using RLC equations. This can be applied to a classic valley fill circuit as well.

Once diode D2 is reverse biased, the LC loop breaks up, and oscillation damping via R1 is not needed. If a voltage drop across R1 during cap discharge is greater than forward voltage across D1, then D1 conducts to prevent IR losses. A Schottky diode can be used for D1. This diode is similar to a pair of discharge diodes in a classic valley fill circuit Diode D2 in principle could be one of the rectifier bridge diodes used in the rectifier circuit, however if a typical filter capacitor is used in an input circuit, D2 needs to be separate to prevent charge outflow into the input-stage filter capacitors, represented by capacitor C2, from the storage capacitor C1. This input filter capacitor C2 is particularly needed for switching noise suppression while circuit is operating in conduction mode.

A charge current flows from node 404 through (body) diode 416 to node 414. The charge current flows from node 414 through resistor or resistance R1 to node 408. A discharge current flows from node 408 through diode D1 to node 414. The discharge current flows from node 414 through transistor 411 to node 404. A current in flows from node 402 through diode D2 to node 404. A current out to load flows from node 404 into the buck converter (see FIG. 5).

There are two types of power factor correction (PFC), active and passive. The primary purpose of dedicated active PFC driver circuits is to achieve as high of a power factor as possible. They require large caps at the output, and a transformer instead of just an inductor. The capacitor sizes used necessitate the use of electrolytic capacitors, which have shorter operating lifespan and are less durable than other types of capacitors. Most of high power lighting industry uses these circuits (e.g., class D). Although these circuits are capable solutions, they cost more and have less reliable and use more expensive components (e.g., electrolytic capacitors and transformers). They also inherently have flicker (usually 100 or 120 Hz flicker). The larger the output capacitor size, the less that flicker will be.

In comparison, a valley-fill circuit is a passive PFC circuit (such as in FIG. 3 or 4) without the shortcomings of active PFC driver circuits. Such passive PFC circuits are suitable for lower power lighting equipment (e.g., class C). They can be used for higher power, but depending on the jurisdiction, may not have a sufficiently high power factor to comply with power factor and harmonic regulations for certification for higher power lighting.

The circuit of FIG. 4 uses the valley-fill circuit concept and has a basic means of controlling the conduction angle. The circuit also achieves one capacitor use, while increasing its charge voltage, thus decreasing the size of this capacitor. This makes the use of ceramic, polyethylene, or polypropylene capacitors possible. This eliminates the need for using electrolytic capacitors, which do not have as long of a lifespan or durability as ceramic and polyethylene capacitors. Lighting fixtures using this circuitry will inherently also not have flicker.

Figure 5:
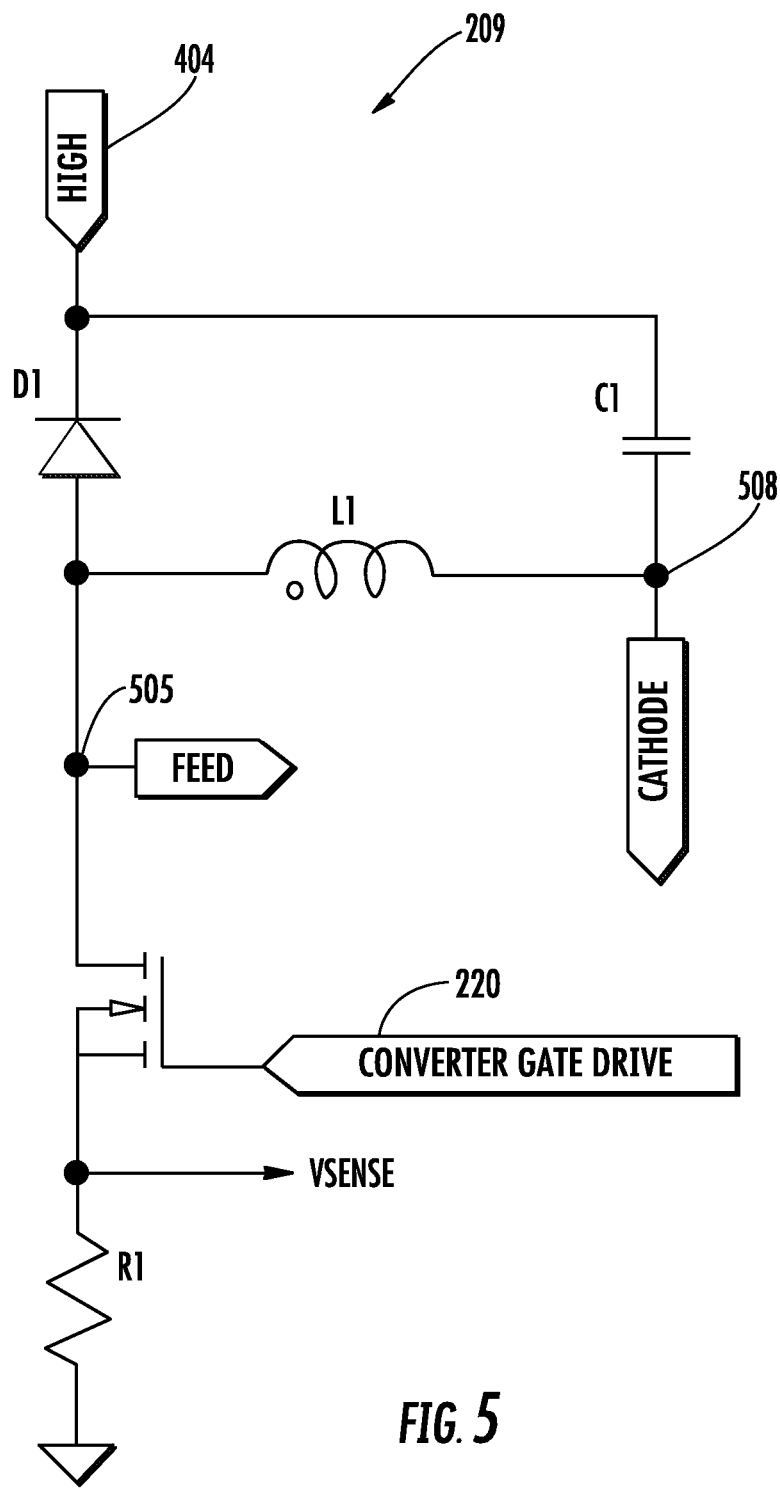
FIG. 5 shows a buck converter circuit.

FIG. 5 shows a buck converter circuit. A buck converter is a step-down DC-to-DC converter circuit. Node 404 is connected to the active valley-fill circuit in FIG. 4. A diode D1 is connected between node 404 and node 505 (Feed). A capacitor or capacitance C1 is connected between node 404 and node 508 (Cathode). An inductor L1 is connected between nodes 505 and 508.

An NMOS transistor is connected between nodes 505 and Vsense. A resistor or resistance R1 is connected between Vsense and ground. A gate electrode of the NMOS transistor is connected to a node 220 (converter gate drive).

In operation, the Vsense line is connected to a peak current controller (e.g., AL9910 integrated circuit). This controller turns off the NMOS once Vsense reaches some set value (e.g., 0.25 volts for AL9910). For stability reasons, the turn off time can be set to a constant.

Figure 6:
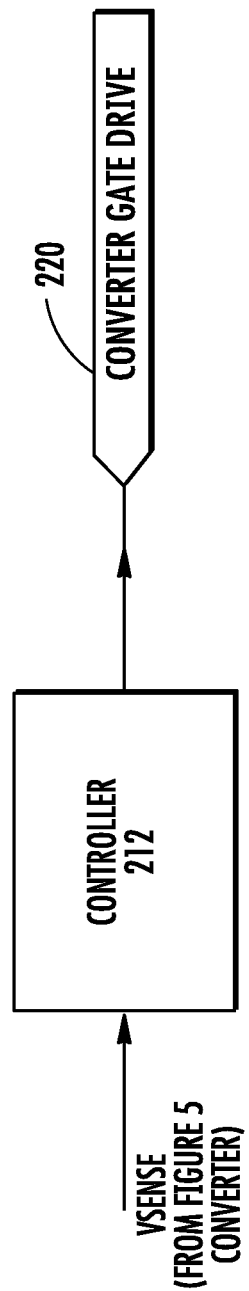
FIG. 6 shows a circuit to generate a gate drive signal.

FIG. 6 shows a circuit to generate a gate drive signal. In a specific implementation, the Vsense line from FIG. 5 is input to an off-line LED driver circuit, such as an AL9910 integrated circuit by Diodes Incorporated. Data sheets, white papers, on-line information, and other documents for the AL9910 integrated circuit are incorporated by reference along with all other references cited in this application.

Using Vsense, the off-line LED driver circuit generates an NMOS gate drive signal that is in this implementation also connected to high-input impedance frequency monitoring circuit.

Figure 7:
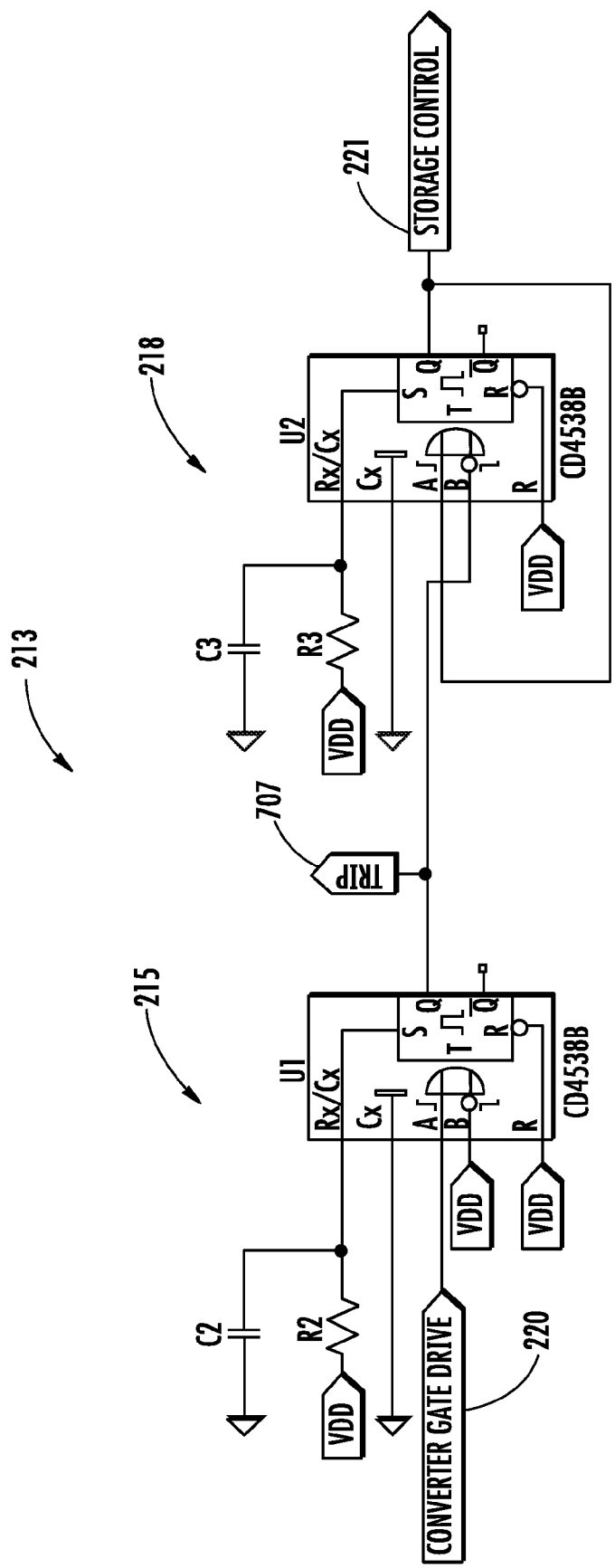
FIG. 7 shows a control circuit for transistor and capacitor of the valley-fill circuit.

FIG. 7 shows an implementation of frequency monitoring control circuit for generating control signal for the switch of the valley-fill circuit. The control circuit includes retriggerable circuit 215 and one-shot circuit 218.

In a specific implementation, the retriggerable circuit and one-shot circuit are implemented using CD4538B dual integrated circuit connected as shown.

The retriggerable circuitry generates a logic high pulse at an output 707 (Trip) once gate drive pulse time to the buck converter's low-side switch exceeds time constant set by the choice of R2 and C2. This indicates that maximum allowed duty cycle for buck converter has been reached. Thus the rectified line voltage is approaching some minimum value, such as, set for example, by forward voltage of a diode string.

The trip voltage for one-shot multivibrator circuit 218 at node 707 is a short pulse, since once storage capacitor begins to supply current to the converter, converter frequency increases, or duty cycle decreases, returning node 707 to the original level. Once the edge at 707 (TRIP) is sensed, the one-shot circuitry initiates the discharge phase by generating logic high, for a period of time set by R3 and C3, at an output 221 (Storage Control). During that time the circuit draws current from the storage cap until line voltage starts to exceed capacitor voltage. The PMOS gate drive should be released sometime after that and during the charge-conduction phase before the conduction phase starts. If not, the capacitor cap charge gets "spilled" (discharged) through the top switch. The PMOS drive pulse time can be set to a quarter of line period (e.g., half-period of rectified line voltage).

Figure 8:
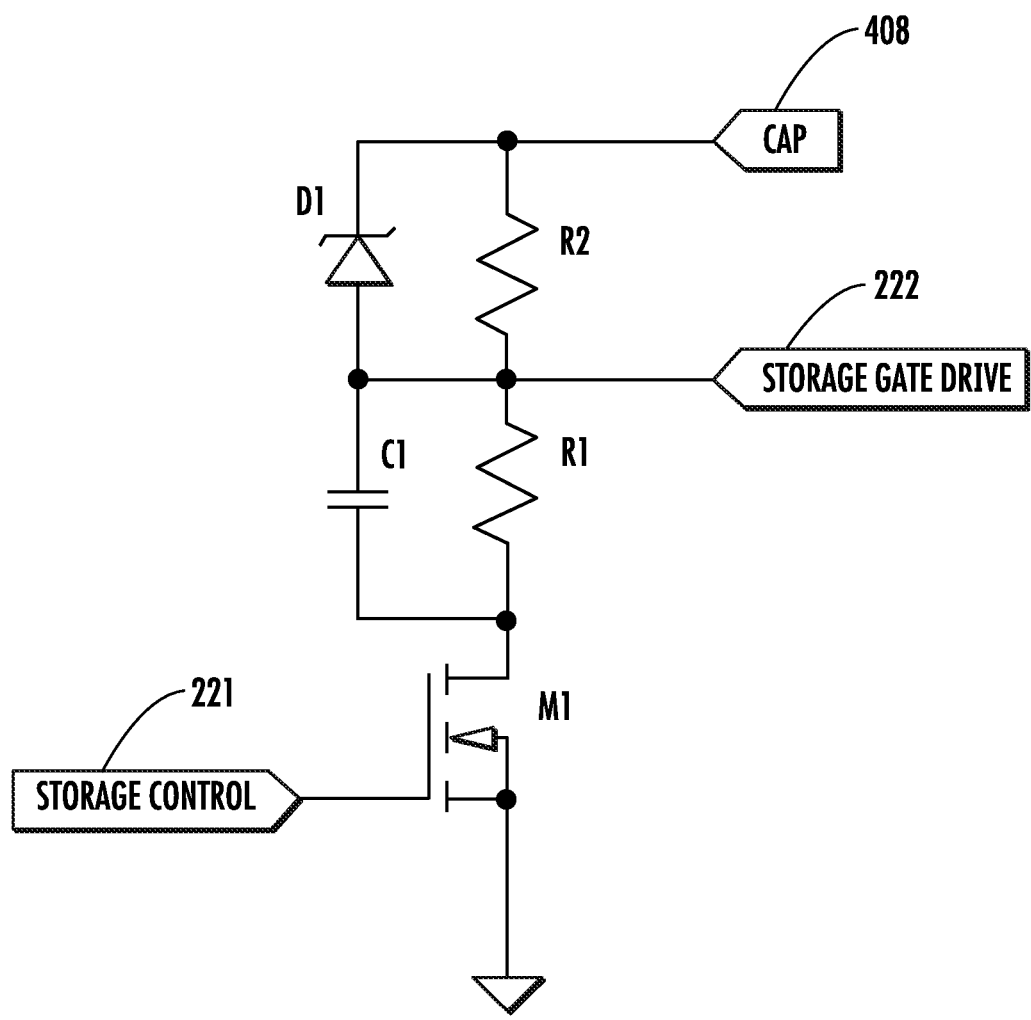
FIG. 8 shows a transistor gate drive generator circuit.

FIG. 8 shows one implementation of a storage transistor gate drive generator circuit. Node 222 (STORAGE GATE DRIVE) is used to control switch in FIG. 4. Node 221 (STORAGE CONTROL) is derived from frequency-monitoring circuit in FIG. 7. Node 408 (Cap) is connected to node 408 in FIG. 4. Zener diode D1 breakdown voltage needs to be chosen appropriately to generate sufficient gate voltage for the PMOS switch. Due to very low switching frequency, this circuit and its derivatives can be efficiently implemented at low component cost.

FIGS. 9-12 show the transient waveforms for operation of the active valley-fill circuit with active conduction angle control circuitry.

Figure 9:
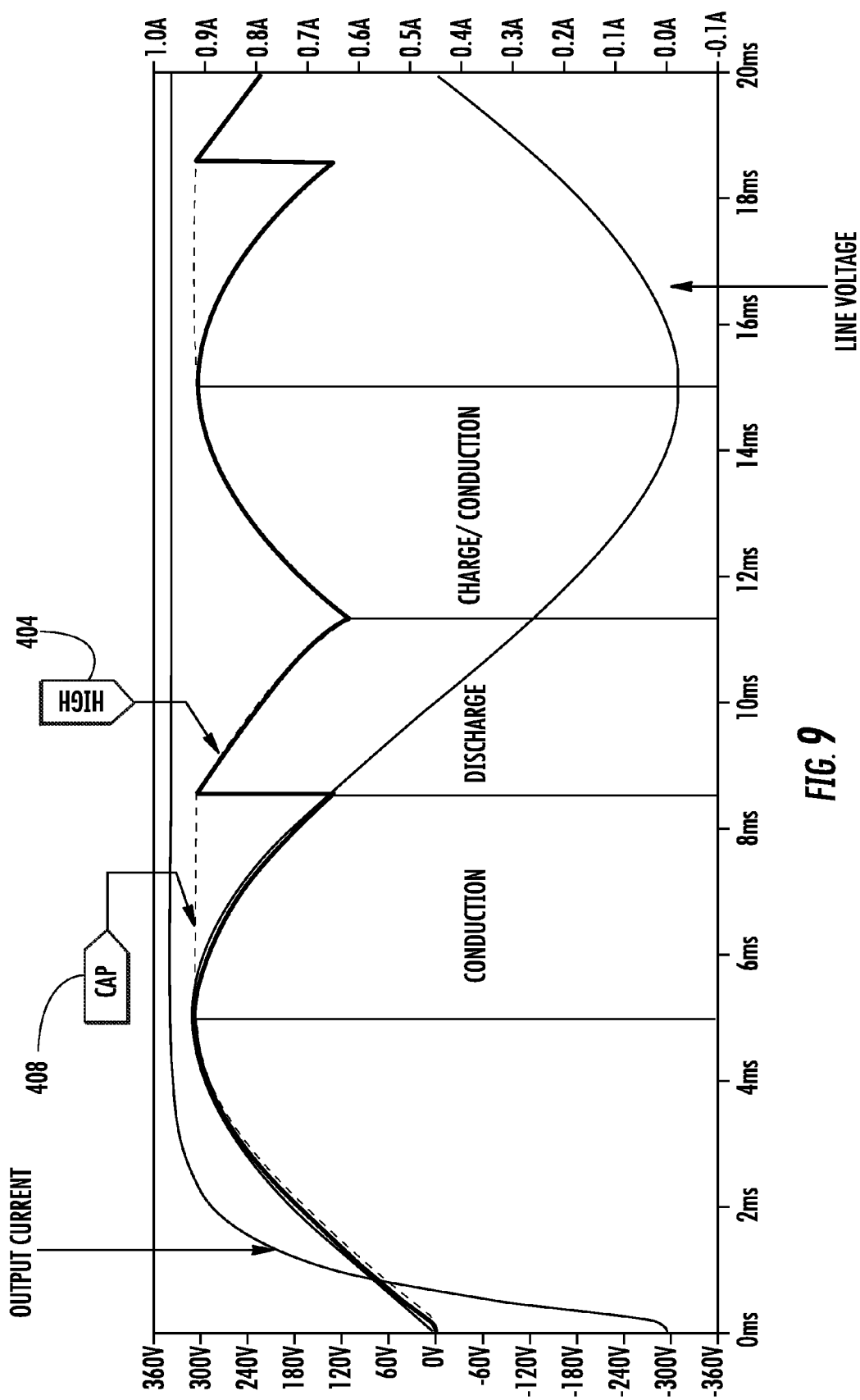
FIGS. 9-12 show transient waveforms for operation of the active valley-fill circuit with active conduction angle control circuitry.

Specifically, FIG. 9 shows a transient-response waveform for the circuit including the waveforms at the output current, capacitor voltage, input to the converter 404, and line voltage nodes. In this particular figure, the conduction phase is from about 5 millisecond to about 8.25 milliseconds. The discharge phase is from about 8.25 milliseconds to about 11.5 milliseconds. The charge-conduction phase is from about 11.5 milliseconds to about 15 milliseconds.

Figure 10:
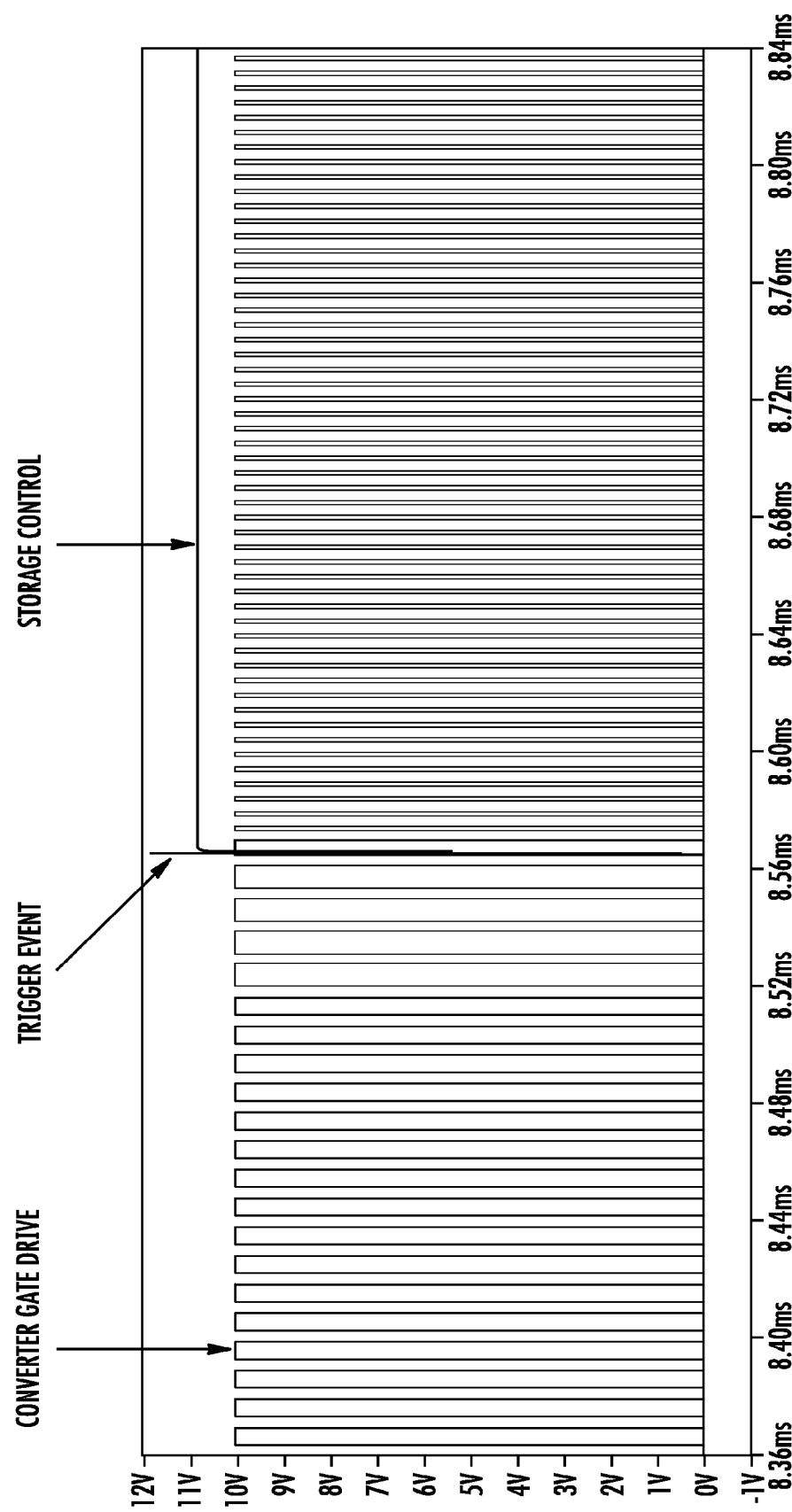

FIG. 10 shows the waveforms at node 221 (STORAGE CONTROL), node 220 (CONVERTER GATE DRIVE), trigger event at node 707 (TRIP), and storage control.

Figure 11:
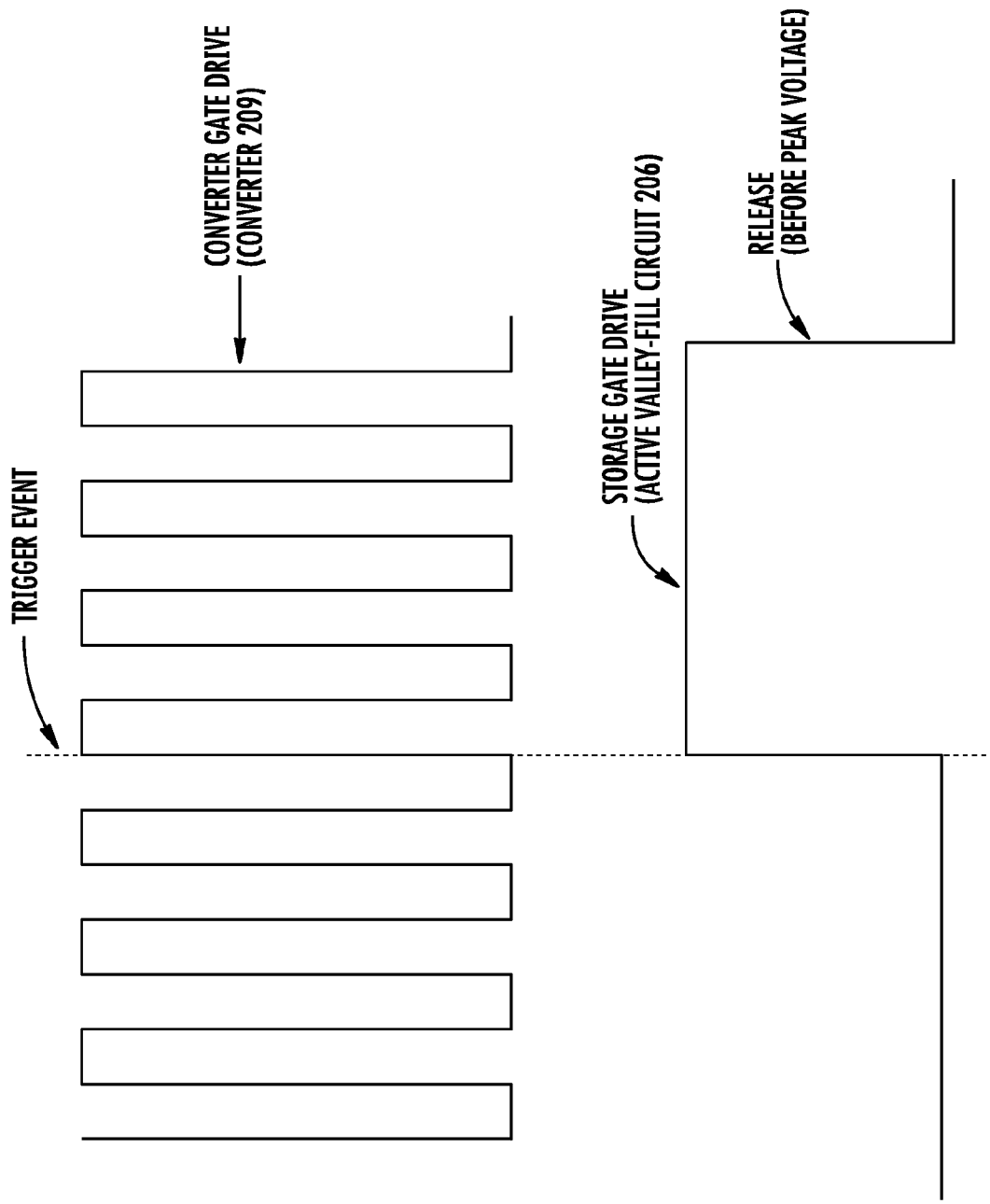

FIG. 11 shows waveforms at node 222 (STORAGE GATE DRIVE) and node 220 (CONVERTER GATE DRIVE). The waveforms show a trigger event and a release, before peak voltage.

Figure 12:
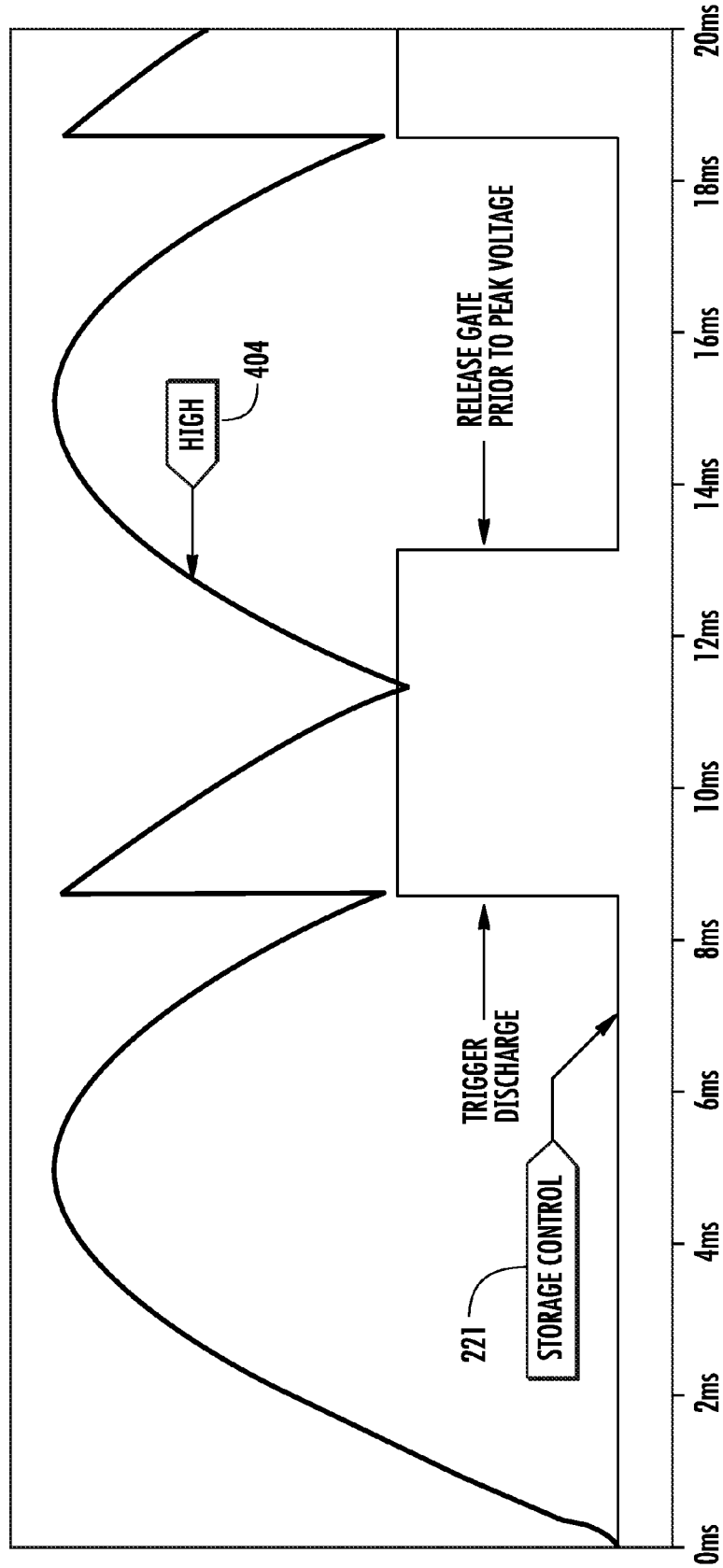

FIG. 12 shows the waveforms at node 221 (STORAGE CONTROL) and the input to the converter 404. For storage control 221, there is a trigger that triggers discharge at node 404. At a time period later, storage control 221 releases the gate prior to peak voltage at node 404.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A circuit, which charges a storage capacitor to a peak-to-peak voltage of AC cycle and has means for initiating discharge, comprising:
   a transistor, comprising gate, drain, source, or body electrodes, or any combination of these electrodes;
   a storage capacitor, coupled between a first node and ground, wherein the storage capacitor is implemented using a ceramic, polyethylene, polypropylene, or any other suitable capacitor type, other than a electrolytic type capacitor, that may be needed for high-reliability operation;
   a pair of a first diode and a resistance, connected in parallel to each other and in series to the storage capacitor, to control peak charging current of the capacitor and dampen input current oscillations;
   a second diode switch, which isolates storage capacitor from external power input while output circuit is supplied by the storage capacitor; and
   a body diode of the transistor, coupled between the drain and source electrodes of the transistor.

2. The circuit of claim 1 comprising:
   a timing circuit, which senses approach of zero-crossing point (when AC input voltage crosses zero voltage) by monitoring switching frequency of a peak current mode controller and provides control signal of a presettable time duration for storage capacitor discharge, when switching frequency decreases below some pre-settable value, and comprises:
   a retriggerable multivibrator to sense crossing of switching frequency below the threshold value; and
   a one-shot multivibrator to provide the discharge duration time within a designed timing envelope.

3. A light emitting diode lighting fixture comprising the circuit of claim 1.

\* \* \* \* \*